United States Patent [19]

Wraight et al.

[11] Patent Number: 4,814,609

[45] Date of Patent: Mar. 21, 1989

[54] METHODS AND APPARATUS FOR SAFELY MEASURING DOWNHOLE CONDITIONS AND FORMATION CHARACTERISTICS WHILE DRILLING A BOREHOLE

[75] Inventors: Peter D. Wraight, Missouri City; Edouard Marienbach, Houston; Jean-Michel Hache, Sugar Land; Erik Rhein-Knudsen, Houston; Mike Evans, Missouri City, all of Tex.

[73] Assignee: Schlumberger Technology Corporation, Houston, Tex.

[21] Appl. No.: 25,319

[22] Filed: Mar. 13, 1987

[51] Int. Cl.$^4$ .......................... G01V 5/12; G01V 5/14
[52] U.S. Cl. .................................. 250/254; 250/266; 250/269; 250/270
[58] Field of Search ............... 250/254, 269, 270, 264, 250/265, 266

[56] References Cited

U.S. PATENT DOCUMENTS

| | | |
|---|---|---|
| 2,443,731 | 6/1948 | Herzog et al. |
| 2,986,639 | 5/1961 | Josendal et al. ............ 250/254 |
| 3,071,689 | 1/1963 | Scherbatskoy . |
| 3,078,370 | 2/1963 | Monaghan . |
| 3,255,353 | 6/1966 | Scherbatskoy ............ 250/254 |
| 3,321,625 | 5/1967 | Wahl . |
| 3,521,065 | 7/1970 | Locke . |
| 4,006,777 | 2/1977 | LaBauve ............ 166/250 |
| 4,048,495 | 9/1977 | Ellis ............ 250/264 |
| 4,180,730 | 12/1979 | Givens et al. ............ 250/265 |
| 4,412,130 | 10/1983 | Winters ............ 250/260 |
| 4,468,762 | 8/1984 | Jurgens ............ 367/83 |
| 4,492,865 | 1/1985 | Murphy et al. ............ 250/265 |
| 4,520,468 | 5/1985 | Scherbatskoy ............ 367/83 |
| 4,550,392 | 10/1985 | Mumby ............ 367/82 |
| 4,596,926 | 6/1986 | Coope ............ 250/265 |
| 4,698,501 | 10/1987 | Paske ............ 250/265 |
| 4,705,944 | 11/1987 | Coope ............ 250/265 |

FOREIGN PATENT DOCUMENTS 2175085 of 0000 United Kingdom .
2183831 6/1987 United Kingdom .

OTHER PUBLICATIONS

Roesler et al, "Theory & Application of a Measurement-While-Drilling Neutron Porosity Sensor", SPE/IADC 16057, Mar. 1987.
Koopersmith and Barnett, "Environmental Parameters Affecting Neutron Porosity, Gamma Ray, and Resistivity Measurements Made While Drilling", SPE 16758, Sep. 1987.
Paske, Roesler, Barnett and Rodney, "Formation Density Logging While Drilling", SPE 16756, Sep. 1987.

Primary Examiner—Carolyn E. Fields
Attorney, Agent, or Firm—Stephen L. Borst

[57] ABSTRACT

A borehole logging apparatus for performing radiation based measurements has a tubular body for movement through a borehole. The tubular body includes an upwardly opening passage and an interior chamber for accommodating the positioning and lengthwise insertion and removal of an energy radiating source. The radiation source includes an uppermost portion which may be remotely engaged by a source removing device for its removal in the event the tool becomes stuck in the borehole and in order to facilitate source handling at the earth's surface.

11 Claims, 2 Drawing Sheets

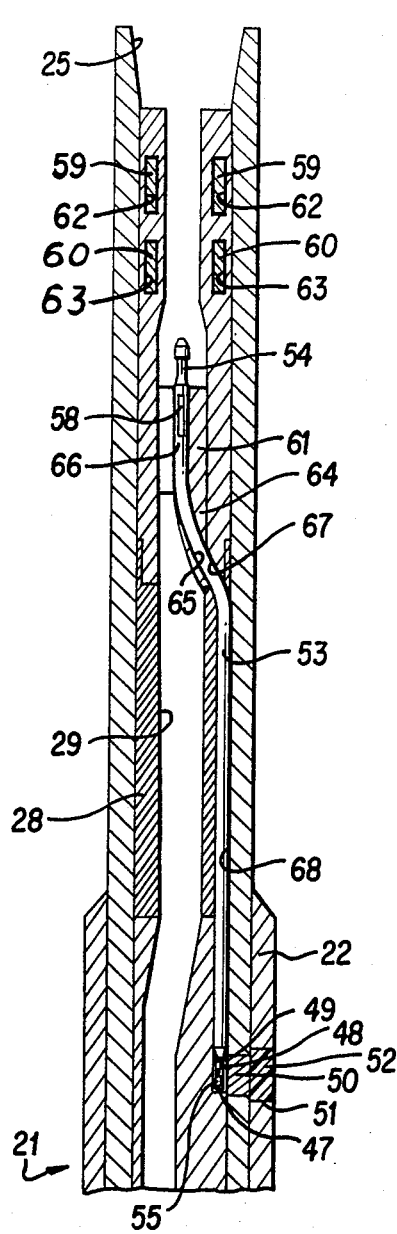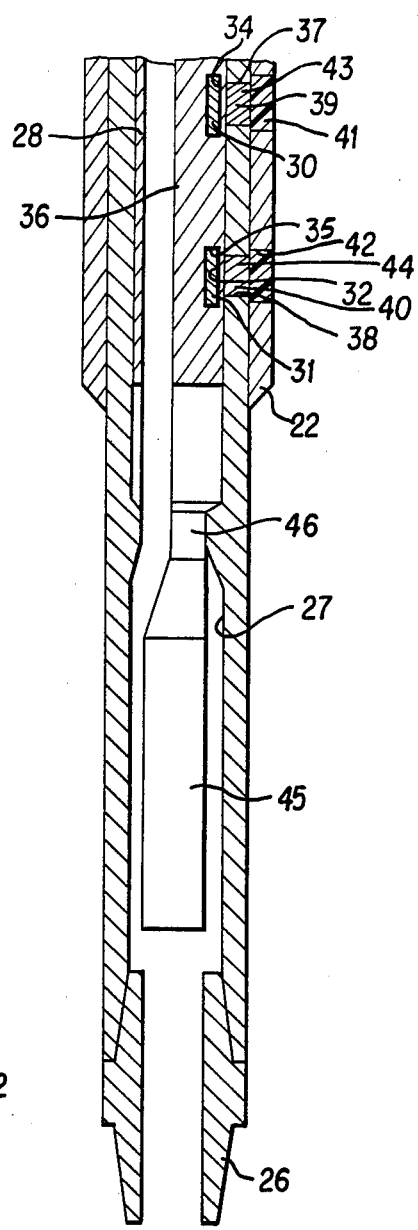
FIG. 2A
FIG. 2B

METHODS AND APPARATUS FOR SAFELY MEASURING DOWNHOLE CONDITIONS AND FORMATION CHARACTERISTICS WHILE DRILLING A BOREHOLE

BACKGROUND OF THE INVENTION

During the drilling of an oil or gas well successive measurements are usually made of various borehole conditions as well as one or more properties of the earth formations that are being penetrated by a drill bit as it progressively excavates the borehole. Even though it was recognized that drilling operations would be greatly improved if measurements such as these could be frequently made, in the past many of these measurements simply could not be obtained unless the drill string and drill bit were temporarily removed from the borehole and one or more wireline logging operations were conducted in the open borehold. Since wireline logging operations can significantly prolong the time needed to complete a borehole, heretofore the usual practice has been to minimize as far as possible the number of so-called "open hole logs" that are run during the drilling of a given borehole.

Those skilled in the art will, of course, recall that different proposals have been advanced heretofore for making one or more of these measurements without removing the drill string and bit. For instance, as depicted in U.S. Pat. No. 3,112,442, it was proposed to provide a self-contained instrument including a suitable power supply, a recorder and various electrical and/or radioactivity sensors that was adapted to be moved through the longitudinal bore of a drill string and landed on a suitable seat just above the drill bit. Once a series of measurements were taken, a so-called "wireline overshot" was lowered through the drill string and coupled to a fishing neck on the upper end of the instrument housing for returning the entire instrument to the surface for analysis of the measurements. A similar arrangement is shown in U.S. Pat. No. 3,209,323 which instead transmitted the recorded measurements to the surface by way of a typical logging cable carrying an overshot having a winding that was inductively coupled to a matched winding in a fishing neck on the instrument. As seen in U.S. Pat. No, 3,186,222, another prior-art proposal employed a self-contained measuring assembly having electrical and/or radioactivity sensors that was mounted on the lower end of the drill string just above the bit. With this arrangement, the output signals from the measuring assembly were converted into successive alternately-polarized electromagnetic pulses which were transmitted along the walls of the drill string to surface detectors by means of self-contained repeater stations tandemly coupled at spaced intervals in the drill string. Since the radioactivity logging devices disclosed in the three above-cited patents were designed to measure only the natural gamma radiation from the earth formations, those logging devices did not require a source of radioactivity.

It will, of course, be appreciated that many of the problems experienced by these several prior-art systems were effectively resolved by the advent of various measuring-while-drilling or so-called "MWD" tools. With the introduction of the MWD tools that are now commercially available, for the first time it became practical to transmit to the surface one or more real-time downhole measurements without interrupting the drilling of a borehole. As described, for example, in greater detail in U.S. Pat. No. 3,855,857, a typical commercial MWD tool may measure such downhole conditions as the so-called weight-on-bit or "WOB" as well as the torque acting on the bit, the azimuthal direction and the angle of inclination of the borehole, borehole pressure and temperature, mud resistivity and various characteristics of the earth formations penetrated by the bit. The output signals of the various sensors are coupled to circuits which selectively control a downhole acoustic signaler in the tool for successively transmitting encoded data signals representative of these real-time measurements through the mud stream in the drill string to suitable detecting-and-recording apparatus at the surface.

It will, of course, be appreciated that MWD tools have been proposed heretofore for providing real-time measurements of different radioactivity characteristics of the earth formations being penetrated by the drill bit. Since measurement of natural gamma radiation requires only a gamma-ray detector and typical circuits to control the signaler, it has not been difficult to provide MWD tools with that instrumentation. Typical MWD tools with this capability are shown, for example, in U.S. Pat. No. 4,520,468 as well as in FIG. 4 of U.S. Pat. No. 3,255,353. On the other hand, as depicted in FIG. 1 of the last-cited patent, to measure other radioactivity characteristics of earth formations, a MWD tool must also have an appropriate source of radiation such as a radioactive chemical source. Since the measurement of formation density is impaired by borehole fluids, as seen, for example, in U.S. Pat. No. 4,596,926 it has been proposed to compensate for the effect of the fluids by arranging an array of radioactive sources and radiation detectors around the tool body.

Those skilled in the art recognize that any time a MWD tool is being used in a drilling operation, it is always possible that the tool may be inadvertently stuck in the borehole. Should the tool or drill string become firmly stuck, it may be necessary to retrieve the upper portion of the drill string and then employ one or more "fishing" techniques to recover the remaining portion of the drill string and the MWD tool from the borehole before the drilling operation can be resumed. Such fishing operations may, however, impose such severe impacts on a MWD tool that its inner components will be severely damaged before the tool is recovered. Thus, should a MWD tool carrying a chemical radioactive source become stuck to such an extent that the tool cannot be readily recovered, it is possible that the radiation shield around the source can be ruptured. If this occurs, the borehole fluids will be contaminated and it may be risky to handle the damaged tool when it is recovered at the surface. Accordingly, the potential risk must always be considered when the conditions in any given borehole are such that the MWD tool may become stuck. In some situations it may be doubtful that the advantages of using a tool with a chemical source justify using that tool while drilling a borehole interval in which the tool may be stuck. As a result, not only will the service company running the MWD tool lose the additional revenue that it would otherwise receive, but the well operator will also forego the data that would have been provided by those measurements dependent upon a radioactive source.

To overcome such problems, various proposals have been made heretofore to provide self-contained instruments that can be moved through the drill string and temporarily stationed in one of the drill collars just above the drill bit. For example, as described in U.S. Pat. No. 4,041,780, a self-contained logging instrument is arranged to be pumped through the drill string to a landing seat that has been temporarily installed on the lower end of the drill string. It is, of course, readily apparent that the major disadvantage of this instrument is that the drill bit must be temporarily replaced with the sub carrying the seat every time a series of measurements are to be made. Thus, since each series of measurements requires two complete round trips of the entire drill string, ordinarily it will be far more practical to simply employ a wireline logging tool for obtaining these measurements while the drill string is out of the borehole. U.S. Pat. No. 4,550,392 also describes a similar self-contained instrument that is moved into and out of the drill string by a cable. However, even though this instrument is installed and removed while the drill string and drill bit are in the borehole, since the sensors in this instrument are always within a thick-walled drill string, some formation radioactivity characteristics simply can not be effectively measured. Moreover, once that instrument has been removed from the drill string, the drilling operation must be continued without the benefit of further downhole measurements.

OBJECTS OF THE INVENTION

Accordingly, it is an object of the present invention to provide new and improved methods for selectively terminating MWD measurements requiring a hazardous downhole radiation source during the course of a drilling operaton with a MWD tool and thereafter obtaining one or more additional measurements that are independent of a downhole radiation source whenever the drilling operation is resumed.

It is yet another object of the present invention to provide new and improved MWD apparatus including a retrievable radiation source that can be returned to the surface should the apparatus become inadvertently stuck in a borehole or should it be desired to continue drilling the borehole without having to discontinue other downhole measurements that are independent of a downhole radiation source.

It is an additional object of the present invention to provide new and improved MWD apparatus including a tubular body that is adapted to be employed with a MWD tool having one or more radiation detectors cooperatively arranged to measure one or more radioactivity characteristics of the adjacent earth formations so long as a retrievable radioactive source carrier of the invention is positioned in the body, with this carrier being cooperatively arranged so that it can be readily returned to the surface during a drilling operation without having to remove the drill string from the borehole in order to remove the hazardous source before drilling can be resumed.

SUMMARY OF THE INVENTION

These and other objects of the present invention are attained in the practice of the new and improved methods which are described herein by interrupting the drilling of a borehole whenever it is believed that the MWD apparatus of the invention and a MWD tool coupled thereto may become stuck in the borehole and removing one or more radioactive sources from the apparatus. Once this has been accomplished, the drilling operation may be resumed while the MWD tool is operated for providing measurements representative of one or more downhole conditions which do not require irradiation by a radioactive source.

To further achieve the objects of the invention, the new and improved MWD apparatus of the invention is adapted to be incorporated with a MWD tool which is adapted to be suspended in a borehole from a drill string for measuring selected downhole conditions and transmitting signals representative thereof to the surface while earth-boring apparatus dependently coupled to the MWD tool excavates the borehole. The new and improved apparatus also includes a retrievable source carrier enclosing one or more chemical radioactive sources and which is cooperatively arranged to be moved through the drill string between a selected station within the body of the apparatus and the surface for irradiating the adjacent earth formations so long as the source carrier is positioned within the apparatus thereby allowing the MWD tool to measure various selected downhole conditions including one or more radioactivity characteristics of the earth formations as they are being penetrated by the earth-boring apparatus.

BRIEF DESCRIPTION OF THE DRAWINGS

The novel features of the present invention are set forth with particularity in the appended claims. The invention, together with further objects and advantages thereof, may be best understood by way of the following description of an exemplary embodiment of apparatus employing the principles of the invention as illustrated in the accompanying drawings, in which:

FIGS. 2A-2B are successive elevational views of the MWD apparatus shown in FIG. 1 that are cross-sectioned and enlarged for illustrating various significant aspects of the present invention.

DETAILED DESCRIPTION OF THE INVENTION

Figure 1:
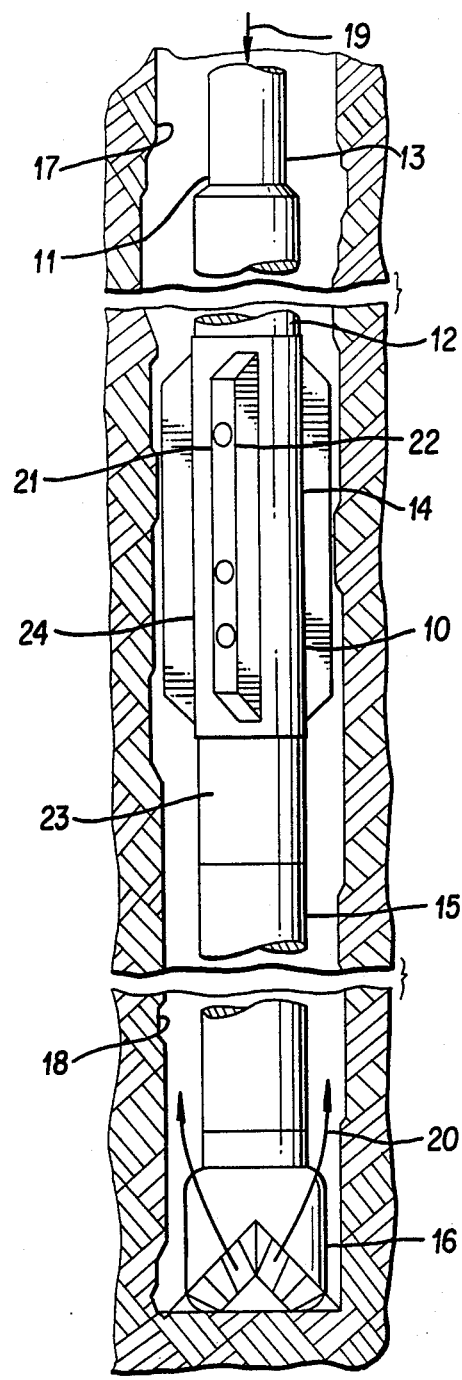
FIG. 1 shows a preferred embodiment of MWD apparatus of the invention during the course of a drilling operation as the apparatus may be cooperatively employed in conjunction with a MWD tool having a plurality of measurement sensors including one or more radiation detectors and an acoustic signaler arranged for transmitting to the surface output signals representative of measurements of various selected downhole conditions as well as measurements representative of the radioactivity returned from adjacent formations in response to irradiation of the formations by one or more chemical radioactive sources carried by the MWD apparatus of the invention.

Turning now to FIG. 1, a preferred embodiment of a new and improved MWD apparatus 10 arranged in accordance with the principles of the present invention is shown dependently coupled to the lower end of a drill string 11 comprised of one or more drill collars, as at 12, and a plurality of tandemly-connected drill pipe joints as at 13. As depicted, the new and improved MWD apparatus 10 includes a tubular body 14 which is coupled to the upper end of a MWD tool 15 that is in turn coupled to earth-boring means such as a fluid-powered turbodrill or a drill bit 16 adapted for progressively excavating a borehole 17 through various subterranean earth formations as at 18. As is customary, once the drill bit 16 has reached the bottom of the borehole 17, the drill string 11 is rotated by a typical drilling rig (not shown) at the surface while substantial volumes of a suitable fluid such as a so-called "drilling mud" are continuously pumped downwardly through the drill string (as shown by the flow arrow 19). This drilling mud is discharged from multiple ports in the drill bit 16 to cool the bit as well as to transport formation materials removed by the bit to the surface as the drilling mud is returned upwardly (as shown by the arrow 20) by way of the annular space in the borehole 17 outside of the drill string 11.

In FIG. 1 it will be seen that the tubular body 14 of the new and improved MWD apparatus 10 is preferably adapted to be tandemly coupled between the MWD tool 15 and the lower end of the drill string 11. From FIG. 1 it will also be noted that the new and improved MWD apparatus 10 further includes an enlarged body, as shown generally at 21, cooperatively arranged on the mid-portion of the body 14 so as to project outwardly toward at least one sidewall of the borehole 17. Although the specific materials and configuration of the enlarged body 21 are wholly incidental to the overall purposes of the invention, as a matter of convenience it has been found that a drill collar stabilizer with two or three generally-helical or straight blades, as at 22, which are preferably of steel or some other gamma-ray shielding material can be readily modified to provide the enlarged body. Since such stabilizers typically have split bodies, it will be appreciated that the modified stabilizer 21 can be quickly clamped around the tool body 14. As will be subsequently described in detail, the modified stabilizer 21 that is to be used for any given operation is selected so that ordinarily the edges of the blades 22 will be spaced no more than about one inch from the adjacent wall surface of the borehole 17, with the ideal clearance being in the order of about one-quarter of an inch. This close spacing will, of course, significantly reduce any tendency for the lower portion of the drill string 11 to move laterally in the borehole 17. It will be appreciated, therefore, that a number of stabilizers, as at 21, of different outside diameters will be required for the practice of the present invention, with the choice of any given stabilizer being used at any given time being dependent upon the diameter of the borehole 17. It should also be realized that by using drill collar stabilizers, as at 21, an adequate flow area will be defined between the stabilizer blades 22 to accommodate the upwardly-flowing stream of drilling mud 20 through the annulus of the borehole 17.

As depicted in FIG. 1, the MWD tool 15 is preferably comprised of an assembly of thick-walled tubular bodies enclosing sensors and circuits (not shown) for measuring various downhole conditions such as the condition of borehole fluids as well as selected properties or characteristics of the formations 18 that have been penetrated by the drill bit 16. Although other means can, of course, be employed to transmit the measurements to the surface, the depicted MWD tool 15 further includes acoustic data-signalling means 23 arranged for receiving output signals from the several measuring sensors and successively transmitting encoded signals representative of these output signals through the drilling mud in the drill string 11 to the surface where the acoustic signals are detected and processed by appropriate signal detecting-and-processing surface apparatus (not illustrated). To practice the present invention, the MWD tool 15 as well as the surface apparatus are preferably arranged in a similar fashion as the downhole and surface apparatus that is disclosed in U.S. Patent Application Ser. No. 740,110, filed on May 31, 1985, or disclosed in U.S. Pat. No. 4,479,564, which (in addition to the patents cited therein) are each incorporated by reference. As will be subsequently described in more detail, the MWD tool 15 also includes typical radioactivity-logging means 24 arranged above the data-signalling means 23.

Turning now to FIGS. 2A-2B, successive elevational views in cross-section are shown of a preferred embodiment of the MWD apparatus 10 of the invention. As depicted, the body 14 has typical box and pin tool joints 25 and 26 arranged for coupling the apparatus 10 between the lower end of the drill string 11 and the upper end of the MWD tool 15. A longitudinal bore 27 is also arranged through the body 14 and sized for accommodating the flow of drilling mud from the drill string 11 to the drill bit 16.

In practicing the present invention it has been found particularly advantageous to operatively arrange portions of the radioactivity-logging means 24 within the body 14 of the new and improved MWD apparatus 10 for enhancing the measurements of the MWD tool 15 of various radioactivity characteristics of adjacent earth formations. Accordingly, as depicted in FIGS. 2A-2B, an elongated cylindrical body 28 is coaxially disposed in the mid-portion of the longitudinal bore 27 and fluidly sealed therein in relation to the outer body 14. The inner body 28 is provided with a longitudinal flow passage 29 of an appropriate size for carrying the drilling mud flowing between the upper and lower portions of the longitudinal bore 27 through the outer body 14, with portions of this passage being laterally offset. To facilitate the measurement of formation density by the MWD tool 15, one set of gamma-radiation detectors 30 and 31 for the MWD tool are enclosed in an elongated fluid-tight chamber 32 that is arranged within the inner body 14 to one side of the flow passage 29 and extends longitudinally along the opposite side of the cylindrical body from the flow passage. To position the detectors 30 and 31 at appropriate longitudinally-spaced intervals inside of the fluid-tight chamber 32, the detectors are respectively mounted in separate upper and lower recesses 34 and 35 formed in a suitable radiation shield 36 that is cooperatively arranged within the chamber and positioned so that the recesses face outwardly away from the flow passage 29. As is typical with gamma-radiation detectors, as at 30 and 31, the radiation shield 36 is fashioned of one or more suitable gamma-ray shielding materials such as bismuth, lead, a tungsten alloy or other materials that are substantially opaque to gamma-ray energy.

Since the steel body 14 will otherwise limit or prevent gamma-ray energy from reaching the detectors 30 and 31, upper and lower lateral openings 37 and 38 are formed in the steel body and respectively aligned with the gamma-ray sensitive elements of the upper and lower detectors in the chamber 32. These openings 37 and 38 are fluidly sealed by radiation-transparent members, as at 39 and 40, such as complementary plugs of beryllium that are each protected from the borehole fluids by a thin titanium sheath. To minimize the adverse effects of the mud standoff, the MWD apparatus 10 of the invention further includes upper and lower openings 41 and 42 which are appropriately arranged in one blade 22 of each of the modified stabilizers 21 so that whenever that stabilizer is properly mounted on the body 14 the openings in the blade will be laterally aligned with their associated openings 37 and 38. To exclude mudcake or other borehole materials from these openings 41 and 42, the openings in each modified blade 22 are also respectively filled with a plug 43 and 44 of epoxy or some other radiation-transparent material.

As depicted in FIG. 2B, in the preferred embodiment of the MWD apparatus 10, at least a portion of the associated electronic circuitry of the radioactivity-logging means 24 of the MWD tool 15 is arranged within a fluid-tight chamber or so-called "cartridge" 45 that is mounted in the longitudinal bore 27 of the body 14 below the cylindrical body 28 and coupled thereto by a tubular extension 46 defining a conductor passage between the detector chamber 32 and the cartridge.

Referring now to FIG. 2A, in the preferred embodiment of the new and improved MWD apparatus 10 of the present invention the upper end portion of the body 28 is cooperatively arranged for defining an upwardly-opening blind bore or radiation-source chamber 47 that is located on the same side of the cylindrical body as the detector chamber 32 and terminated a short distance thereabove. As depicted, the source chamber 47 is also laterally offset in relation to the passage 29 and cooperatively arranged so as to define a reduced-thickness wall portion 48 that extends longitudinally along the opposite side of the cylindrical body 28 from the internal flow passage. Since the outer body 14 would otherwise attenuate the passage of gamma-ray energy, a lateral opening 49 is arranged in the body so as to be aligned with the enclosed source chamber 47 on the other side of the reduced-thickness wall portion 48. The opening 49 is fluidly sealed by a radiation-transparent member 50 similar or identical to the plugs 39 and 40. In keeping with the objects of the present invention, in order to minimize the attenuation of gamma-ray energy, a lateral opening 51 is appropriately arranged above the lateral opening 41 in the blade 22 of each stabilizer 21 so that whenever that stabilizer is properly mounted on the tool body 14 the opening 51 will be laterally aligned with the body opening 49. The opening 51 is, of course, filled with a radiation-transparent material 52 for excluding mudcake or other borehole materials.

In keeping with the objects of the present invention, the new and improved MWD apparatus 10 also includes an elongated mandrel or retrievable body 53 having its upper end secured to an upstanding fishing neck 54 and the lower end portion of the body is appropriately sized to be received in the upwardly-opening source chamber 47. A source 55 of gamma-ray energy such as a quantity of cobalt or cesium or any other radioactive substance that produces gamma rays in its decay is cooperatively mounted on the lower end of the elongated body 53 and arranged so that the source will be positioned directly behind and laterally aligned with the body opening 49 whenever the lower end portion of the body is correctly disposed within the source chamber 47. As a matter of convenience, it is preferred to employ an encapsulated chemical source such as those typically used with wireline logging tools.

Accordingly, it will be realized that in keeping with the objects of the present invention, the primary function of the modified stabilizer 21 is to reduce radiation streaming from the source 55 through the borehole 17 to the detectors 30 and 31. Moreover, the stabilizer blade 22 serves to effectively displace or exclude drilling mud from that portion of the borehole annulus that is directly between the adjacent earth formations, as at 18, and the detectors 30 and 31 and the source 55. In this manner, the respective paths that the gamma-ray energy from adjacent formations must take to reach the detectors 30 and 31 as well as the path of gamma-ray energy that is emitted by the radiation source 55 will always be substantially through the formations. Those skilled in the art will, of course, appreciate that even though there will always be a minor amount of drilling mud and, perhaps occasionally, a thin layer of mudcake located between the outer edge of the stabilizer blade 22 and the nearby borehole wall, the modified stabilizers 21 will nevertheless enable the radioactivity-logging means 24 of the MWD tool 15 to obtain formation-density measurements having a degree of accuracy that would not otherwise be possible without the MWD apparatus 10.

It will, of course, be appreciated that in addition to obtaining successive measurements that are representative of the density of the various earth formations being penetrated during a drilling operation, it is also of value to obtain successive contemporaneous measurements that are representative of the neutron porosity of those formations. Accordingly, in keeping with the objects of the invention, portions of the radioactivity-logging means 24 are also cooperatively arranged in the new and improved MWD apparatus 10 for enhancing the measurements provided by the MWD tool 15 representative of the neutron porosity of the earth formations. Thus, as depicted in FIG. 2A, for obtaining these measurements the new and improved MWD apparatus 10 further includes a second radiation source 58 cooperatively associated with the radioactivity-logging means 24 of the MWD tool 15. As was the case with the detectors 30 and 31, other elements of the radioactivity-logging means 24 such as one or more radiation detectors 59 and 60 are cooperatively arranged in the body 14 and spatially disposed from the radiation detectors 30 and 31 and the radiation source 58. In the preferred manner of arranging the MWD apparatus 10, an elongated tubular extension 61 is coaxially arranged in the longitudinal bore 27 and fluidly sealed relative to the body 14 for defining upper and lower enclosed spaces 62 and 63 respectively enclosing the detectors 59 and 60.

Those skilled in the art will, of course, appreciate that the measurements provided by the detectors 59 and 60 will be greatly enhanced by coaxially arranging the radiation source 58 in the body 14. Not only will such a coaxial arrangement better accommodate larger sources with correspondingly greater radiation output strengths such as americium beryllium, but the centralized location will also provide symmetrical output responses from the detectors 59 and 60. As depicted, in the preferred embodiment of the MWD apparatus 10, the radiation source 58 is mounted on the upper end portion of the elongated body 53 just below the fishing neck 54. Since it is of paramount importance in practicing the present invention that the radiation sources 55 and 58 can be readily removed from the MWD apparatus 10, the elongated body 53 is preferably arranged as a flexible member such as a relatively-stiff metal cable cooperatively intercoupling the fishing neck 54 and the radiation sources.

To correctly position the radiation sources 55 and 58 in the longitudinal bore 27, a centralizing member 64 is disposed in the extension 61 and adapted to define a central passage 65 with an upper axially-aligned portion cooperatively arranged for centering the upper end portion of the retrievable body 53 in the tool body 14. The central passage 65 is further arranged with a lower downwardly-inclined portion 67 that diverts the intermediate portion of the retrievable body 53 to the side of the body 27 so that the lower portion of the retrievable member can be loosely retained within a laterally-offset longitudinal passage 68 that extends along one side of the extension member 61 and is aligned with the bore 47 in the central body 28. Accordingly, it will be seen from FIG. 2A that although the two interconnected passages 66 and 68 cooperate to correctly position the sources 55 and 58 in the body 14, by virtue of the flexibility of the elongated body 53 and the curvatures of the transitional portions of the two passages, the elongated body can be readily removed from the tool body. Thus, in accord with the objects of the present invention, it will be recognized that removal of the radiation sources 55 and 58 can be selectively accomplished by lowering a suitable wireline grapple (not shown) through the drill string 11 and on into the upper end of the body 14 until the grapple is securely coupled to the upstanding fishing neck 54. Removal of the lower and upper sources 55 and 58 will, of course, be carried out without it being necessary to disconnect any electrical connections. Moreover, even though the removal of the sources 55 and 58 will render the radioactivity-logging means 24 thereafter inoperative, the MWD tool 15 will still be functional so that it can continue to provide the other downhole measurements that are independent of either of the radiation sources 55 and 58.

Thus, in keeping with the objects of the invention, it will be appreciated that so long as the radiation sources 55 and 58 are positioned within the MWD apparatus 10 of the invention, the radioactivity-logging means 24 of the MWD tool 15 will be operative to provide successive signals representative of the formation density and porosity of the earth formations 18 that have been penetrated by the drill bit 16. On the other hand, should the MWD tool 15 or lower portion of the drill string 11 become stuck in a borehole interval, it will be recognized by those skilled in the art that the retrievable body 53 can be readily removed from the apparatus 10 and returned to the surface as a safety precaution before any attempt is made to recover the MWD tool. In a similar fashion, it will be appreciated that even though the retrievable body 53 will generally be left in position within the body 14 during the course of a drilling operation, it will be a simple matter to remove the retrievable body from the MWD apparatus 10 as a precautionary matter without affecting the subsequent operation of the MWD tool 15 for obtaining one or more measurements that are independent of radiation sources such as those shown at 55 and 58. Accordingly, should it be believed that the drill bit 16 is about to drill into a formation interval in which there is a risk that the MWD apparatus 10 may become stuck, the drilling operation can be halted long enough to allow a wireline grapple to be lowered through the drill string 11 and coupled to the fishing neck 54 on the retrievable body 53. Once the radioactive sources 55 and 58 have been safely returned to the surface, drilling of the borehole 17 may, of course, be resumed while continuing to operate the MWD tool 15 for measuring the other downhole conditions which do not require potentially-dangerous chemical radioactive sources.

While only a single embodiment of the present invention and one mode of practicing the invention have been illustrated and described herein, it is apparent that various changes and modifications may be made without departing from the principles of the present invention in its broader aspects; and, therefore, the aim in the appended claims is to cover all such changes and modifications as fall within the true spirit and scope of this invention.

What is claimed is:

1. A logging apparatus having a tubular body for movement through a borehole while making investigations of the properties of earth formations surrounding the borehole comprising:
   a. an upwardly opening passage in an upper portion of said tubular body for accommodating the lengthwise insertion and removal of an energy radiating source;
   b. a chamber in the interior of said tubular body and communicating with said passage for receiving an energy radiating source therein;
   c. an energy radiating source means comprising a source and source mount removably positioned in said chamber, said source means including means for removing said source, said removing means comprising an uppermost portion of said source means configured so as to be engagable by a source removing device; and
   d. a radiation detector disposed at a location spaced lengthwise from said chamber.

2. The logging apparatus as recited in claim 1 in which said source includes a gamma ray source and wherein said apparatus includes means arranged on the exterior of said tubular body for substantially reducing radiation streaming through the borehole annulus from said source to said detector.

3. The logging apparatus as recited in claim 2 further including passages adjacent both said chamber and said detector for directing gamma radiation through said tubular body and said exterior means.

4. The logging apparatus as recited in claim 3 further including means in said passages for excluding fluids in the borehole annulus from said passages and for permitting the passage of gamma rays therethrough.

5. The logging apparatus as recited in claim 2 wherein said gamma ray source is disposed eccentered from the longitudinal central axis of said tubular body.

6. The logging apparatus as recited in claim 1 in which said source includes a neutron source and said apparatus further includes means for positioning said neutron source on the longitudinal central axis of said tubular body.

7. The logging apparatus as recited in claim 1 wherein said energy radiating source includes a neutron source and a gamma ray source and means for coupling one to the other.

8. The logging apparatus as recited in claim 7 further including means on the interior of said tubular body for positioning said neutron source on the longitudinal central axis of said tubular body and for positioning said gamma ray source eccentered from the longitudinal central axis of said tubular body.

9. The logging apparatus as recited in claim 1 wherein said tubular body comprises a drill collar.

10. The logging apparatus as recited in claim 7 wherein said source coupling means is laterally flexible.

11. The logging apparatus as recited in claim 1 wherein said chamber is an upwardly opening chamber at least partially located in the wall of said tubular body.

* * * * *